(12) United States Patent
Zenith (10) Patent No.: US 7,036,083 B1
(45) Date of Patent: Apr. 25, 2006

(54) MULTIMODE INTERACTIVE TELEVISION CHAT

(75) Inventor: Steven Ericsson Zenith, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/461,565

(22) Filed: Dec. 14, 1999

(51) Int. Cl.
*G06F 3/00* (2006.01)

(52) U.S. Cl. .................. 715/758; 715/718; 715/788

(58) Field of Classification Search ............ 348/13, 348/468, 552, 478; 345/12, 552, 555, 132, 345/558, 854, 717, 719, 720, 718, 722, 809, 345/758, 788, 800; 707/501.1; 715/714–720, 715/722, 758, 788, 721
See application file for complete search history.

(56) References Cited

U.S. PATENT DOCUMENTS

| | | | | |
|---|---|---|---|---|
| 5,694,163 A * | 12/1997 | Harrison | ............ | 348/486 |
| 5,737,011 A | 4/1998 | Lukacs | ............ | 348/15 |
| 5,774,666 A * | 6/1998 | Portuesi | ............ | 345/200.48 |
| 5,828,839 A | 10/1998 | Moncreiff | ............ | 395/200.34 |
| 5,889,950 A | 3/1999 | Kuzma | ............ | 395/200.48 |
| 6,061,716 A * | 5/2000 | Moncreiff | ............ | 709/204 |
| 6,081,830 A * | 6/2000 | Schindler | ............ | 715/758 |
| 6,195,094 B1 * | 2/2001 | Celebiler | ............ | 345/764 |
| 6,219,042 B1 * | 4/2001 | Anderson et al. | ............ | 715/716 |
| 6,323,911 B1 * | 11/2001 | Schein et al. | ............ | 348/552 |
| 6,326,935 B1 * | 12/2001 | Boger | ............ | 345/552 |
| 6,400,381 B1 * | 6/2002 | Barrett et al. | ............ | 345/758 |
| 6,425,012 B1 * | 7/2002 | Trovato et al. | ............ | 709/227 |
| 6,785,708 B1 * | 8/2004 | Busey et al. | ............ | 709/204 |

* cited by examiner

*Primary Examiner*—Weilun Lo
*Assistant Examiner*—Truc T. Chuong
(74) *Attorney, Agent, or Firm*—Workman Nydegger (57) ABSTRACT

A user interface device has a graphical user interface that can simultaneously display a combination of television and Internet content in various display modes. The display modes may have different proportions, positioning or other features of the Internet and television content. A viewer of the user interface device may change display modes, such as by selecting a link available in each of the display modes. The television content being displayed may be a broadcast show and the Internet content may be chat from a chat room corresponding to the television show. Various display modes are provided for displaying the television show and corresponding chat, ranging from maximal television display and minimal chat display to minimal television display and maximal chat display. Changing television channels may initiate a corresponding change in the chat room being participated in and the content being displayed.

15 Claims, 4 Drawing Sheets

MULTIMODE INTERACTIVE TELEVISION CHAT

BACKGROUND OF THE INVENTION

Communication networks such as the Internet have recently experienced dramatic growth in popularity and use. An advantage of the Internet that has helped to fuel this growth is the availability of quick and easy communication between widely disparate individuals and networks regarding virtually limitless topics. Thus, not only does the Internet provide for traditional communication, such as between a pair of friends, relatives or coworkers, but the Internet also facilitates communication between strangers and groups of strangers.

Chat is one of the various relatively new forms of communication provided by the Internet. Chat in this sense does not refer to audible conversation engaged in by people gathered together in one place, but rather to textual conversations between people that are connected by the Internet to the same chat room, which may be a file on a server. In this case, a participant in such a chat room types a message into his or her computer and the message virtually immediately appears on all the other computers connected to that chat room.

One of the most popular ways to chat via the Internet is called Internet Relay Chat (IRC). IRC employs special IRC servers that run the chat rooms, and special client/server software that allows client computers to send and receive chat via the IRC servers. The IRC servers may be connected together as a network. Various client computers from around the world may be connected via the Internet to these chat rooms, allowing conversations between disparate individuals who may typically never meet or know each other outside of the chat room experience.

It is common for a chat room to be related to a particular topic, with the participants attracted to that chat room by their interest in the topic. While many chat rooms exist regarding various topics, one popular theme for chat rooms is mass entertainment, such as television shows. Thus, chat rooms may exist devoted to a popular television show, such as "The Simpsons®." Typically, viewers are forced to choose whether to watch television or to participate in a chat room, since most Internet connections are not provided by a television but rather by a separate device such as a computer that may be disposed at a separate location from the television. Moreover, both the television and the computer may be generally immobile, such as with a personal computer located on a desk in a study and a television located in a family room. Thus, many chat participants may converse in a chat room related to a television show before or after the show has played, although some fans may be connected to the chat room while the show is playing.

The advent of interactive television such as provided by WebTV® Networks offers the possibility of being connected to the Internet and watching television simultaneously via a single user interface device. Thus it is possible for a user to be watching a television show and on the same television be connected to a chat room that somehow relates to that show.

Figure 1:
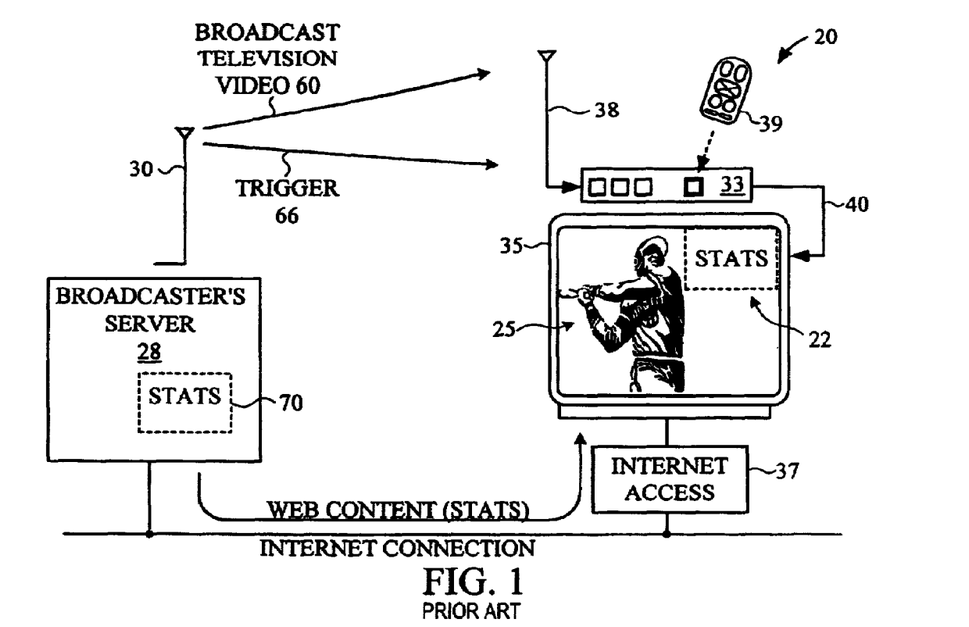
FIG. 1 (Prior Art) is a simple plan view diagram of an interactive television system.

FIG. 1 is a diagram of an interactive television system 20 that enhances a television viewing experience by integrating television programming with enhanced content from the Internet or from the broadcaster. The broadcast of a baseball game can, for example, be enhanced by retrieving relevant information (for example, a batter's batting statistics 22) from the Internet and displaying that information at an appropriate point in the baseball game (for example, when the batter 25 is batting). If the batter's batting statistics are already displayed by the broadcast, then statistics 22 may involve the team's standings, or the number of wins needed to clinch a playoff spot, or a variety of other topics that may be accessed via the Internet.

System 20 includes a server 28 maintained by the broadcaster, a broadcasting antenna 30, a receiver unit 33, a television set 35, and an Internet access point 37. Receiver unit 33, which may be a set-top box, includes a receiving antenna 38 and a remote control unit 39. A viewer uses remote control unit 39 to control the receiver unit and/or to interact with interactive television content via the receiver unit. A video link 40 couples receiver unit 33 to television set 35 so that the receiver unit can use the television set as a display device.

Figure 2:
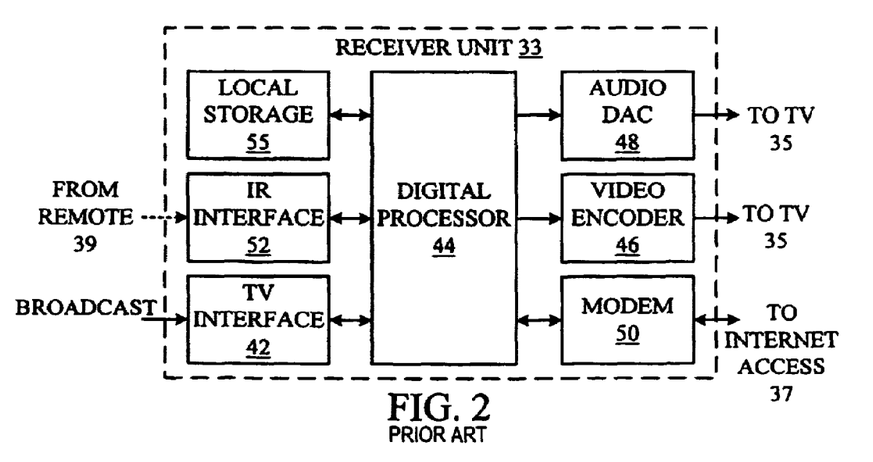
FIG. 2 (Prior Art) is a block diagram of a receiver unit of the system of FIG. 1.

FIG. 2 is a block diagram of receiver unit 33. TV interface circuitry 42 of the receiver unit 33 includes a tuner that is tuned to receive broadcast television video and to remove a television carrier signal. TV interface circuitry 42 digitizes the video signal after the carrier signal has been removed. Software executed by a digital processor 44 receives the digitized signal from TV interface 42 and decodes and checks the digitized signal for errors. Receiver unit 33 drives the television set 35 via video encoder 46 and audio digital-to-analog converter 48. Digital processor 44 realizes a type of web browser that can access the Internet via a modem 50. Receiver unit 33 includes an infrared interface 52 for receiving infrared transmissions from remote control unit 39. Local storage 55 provides memory for processor 44, and may house a web browsing program, such as Microsoft Internet Explorer® or Netscape Navigator®.

Television video 60 is broadcast over the airwaves from broadcasting antenna 30 to receiving antenna 38 of receiver unit 33. Alternatively, television video may be broadcast via cable or satellite or other known means. The broadcast signal may include digital data. At an appropriate time in the baseball game when the broadcaster wishes batter statistics 22 to be displayed (for example, when batter 25 appears on the television screen), the broadcaster broadcasts a trigger 66 along with the television video 60. Trigger 66 contains a Uniform Resource Locator (URL) that identifies an information resource 70 on the broadcaster's server 28 or another server, not shown. In this case, information resource 70 is a web page containing the batter's statistics.

Receiver unit 33 receives trigger 66, accesses the Internet via Internet access point 37, uses the URL from the trigger to retrieve the web page of batter statistics from server 28, and then displays the batter statistics 22. In this way, broadcasters use triggers to have their viewers' receiver units retrieve information from the Internet and display that information in concert with their programming. Receiver unit 33 and television 35 together form a user interface device that is a client of the server 28 while connected to the Internet, similar to a personal computer that is connected to the Internet by an Internet service provider (ISP).

Unlike traditional television, interactive television offers to the viewer the possibility of varying the format of the information being displayed, for example by choosing whether or not to display Internet content along with a television broadcast. While such a complete change in display format between interactive and non-interactive television is currently available, other changes in display format may also be desirable. For example, viewers that are connected to a chat room may wish to change the relative proportion of chat versus television content that is being displayed. This change in proportion of content may occur when a viewer's primary interest changes from watching television to chatting. In other words, a viewer may initially wish to passively observe a small stream of chat while primarily focusing on the television broadcast. Should that viewer wish to become more active in the chat room, perhaps including sending messages to the chat room, the viewer may wish to change the relative proportions of the display screen devoted to chat versus television. Unfortunately, convenient means for changing the proportions of interactive versus television content being displayed are not currently available.

SUMMARY

In accordance with the present invention, a user interface device having a graphical user interface can simultaneously display a combination of television and Internet content in various display modes. The display modes may offer different proportions, positions or other features of Internet versus television content. Devices are included in each display mode for conveniently changing to other display modes. A viewer of the user interface device may be able to change from one display mode to another simply by selecting a link available in the first display mode.

In one embodiment, the television content being displayed is a show and the Internet content is chat from a chat room corresponding to the television show. Various display modes may be available for displaying the television show and corresponding chat, ranging from maximal television display and minimal chat display to minimal television display and maximal chat display. Changing television channels may initiate a corresponding change in the chat room in which the viewer is participating and in the chat being displayed.

DESCRIPTION OF THE PREFERRED EMBODIMENT

Figure 3:
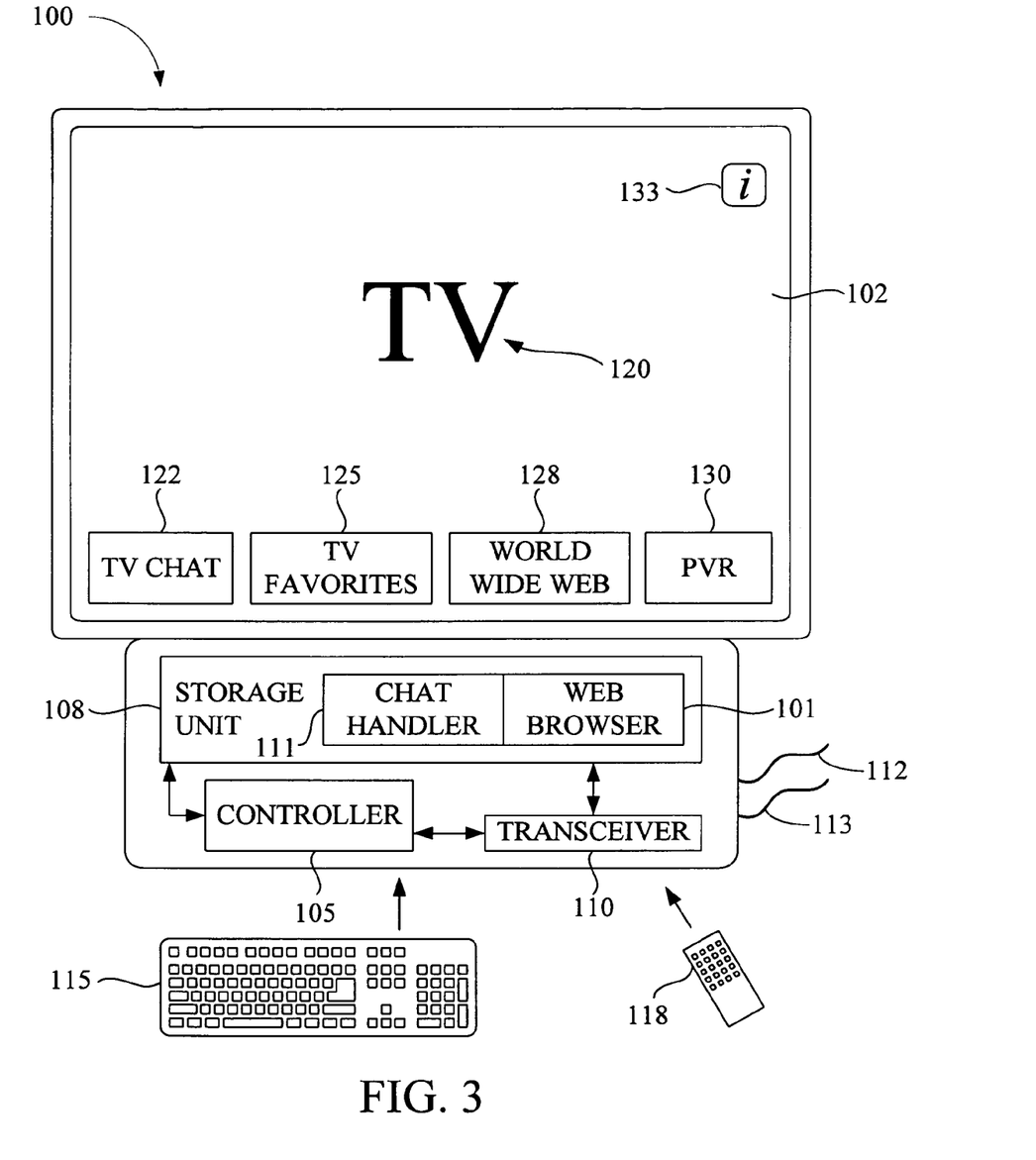
FIG. 3 is a schematic view of a user interface device that can display both television content and Internet content.

FIG. 3 shows a user interface device 100 including a display screen 102 such as a cathode ray tube (CRT), flat panel display, or touch screen display. In general, the user interface device may take the form of a personal computer, a television having a set-top box or other means of processing and transmitting communications, a laptop or handheld computer, a personal digital assistant (PDA), a telephone, an internet appliance or other device having the communications, processing and display capabilities for performing the present invention. The user interface device 100 in this embodiment also includes a controller 105 that manages a transceiver 110. Controller 105 may include a digital processor, an application specific integrated circuit (ASIC) and local memory, such as semiconductor memory. Transceiver 110 may also contain local memory such as semiconductor memory. A storage unit 108 such as a disk drive or additional semiconductor memory may be provided in communication with controller 105 and transceiver 110.

Transceiver 110 may receive television broadcasts and digital data such as Internet or network content via a first channel 112. A second channel 113 can be provided for sending communication to the outside world such as a network, the Internet, broadcast servers or other servers. Channels 112 and 113, which may be combined, may be take the form of twisted pairs of telephone lines, coaxial cable or fiber-optic cable, or may be a link to an antennae for wireless communication. In one embodiment, both broadcast signals such as television broadcasts and an Internet connection are provided by single channel 112. This single channel may be a cable coupled to a cable modem at transceiver 110. In another embodiment, both broadcast signals such as television broadcasts and an Internet connection may be provided by channel 112 connected to a satellite receiver such as a satellite dish, while channel 113 provides another communication link. The means for receiving information by the user interface device may be termed a source channel 112, and the means for transmitting information from the user interface device may be termed a back channel 113.

The transceiver 110 also can receive signals from an optional keyboard 115 and a pointing apparatus 118 such as a mouse or remote control via a wire or the infrared interface, and provides signals via a video encoder/decoder and digital-analog converter for presenting information on the display 102. The display 102 provides a graphical user interface (GUI) managed by controller 105. The device 100 can take the form of a personal computer, a laptop computer, an intelligent network appliance such as a hand-held network appliance or telephone, or an interactive television set.

In one embodiment, the device 100 is a television connected with a set-top box such as a WebTV® Plus Internet terminal, as described in U.S. patent application Ser. No. 09/296,542, which is incorporated by reference herein. The transceiver 110 in this case has TV interface circuitry including a tuner that is tuned to receive the broadcast television video and to remove a television carrier signal. After the carrier signal is removed, TV interface circuitry digitizes the resulting video signal. In addition to the television interface, transceiver 110 preferably includes an infrared interface, a digital-analog converter, a video encoder/decoder and a modem. Software executed by the controller 105 receives the digitized signal from TV interface and decodes and checks the digitized signal for errors. Transceiver 110 drives the display 102, which in this embodiment is a television set, via video encoder and audio digital-to-analog converter. The user interface in this embodiment has been specialized for viewing on an interlaced TV screen rather than a computer monitor. The controller 105 runs a web browser that can access the Internet via a modem or transmitter contained in the transceiver.

Device 100 can simultaneously display both television content and Internet content. The storage unit 108 has stored thereon an operating system, such as Windows CE®, and a web browser program 101 such as Microsoft Internet Explorer®, Netscape Navigator® or the WebTV® browser. The web browser program is run by the controller for accessing the Internet from the user interface device. Also stored on the storage unit is a chat handler program 111, which may for convenience be assembled from ActiveX or component object module (COM) components. The chat handler program is run by the controller and manages connectivity between the user interface device 100 and IRC servers. A chat buffer is provided for temporary storage of chat messages in the local memory of transceiver 110 or in storage unit 108.

FIG. 3 depicts an opening screen that a viewer may encounter, including a television show 120 and several viewing choices, such as TV chat 122, TV favorites 125, World Wide Web 128 and personal video recorder (PVR) 130. Also present in an upper right corner of the display screen 102 is an icon 133 for choosing to view interactive TV. In general, the device 100 can display pure television broadcasting, pure web pages, or a combination of television and web pages. To combine television and web pages, television programs can be inserted as tags within hypertext transfer markup language (HTML) documents that are interpreted by the web browser program 101, in accordance with the Advanced Television Enhancement Forum (ATVEF) Specification, incorporated by reference herein. The television programming thus inserted can be rendered as a small proportion of the display screen, with the web page occupying the remainder of the screen. Alternatively, by tagging the television as a background and specifying a reduced size for the other content, the web page can overlay a part of the larger television show displayed on the screen.

Selecting TV chat 122 by the pointing device, for example, sends a request from the chat handler to an IRC server to join a chat room. The chat room selected may correspond to the particular television show 120 being displayed. That television show 120 may be identified by the chat handler via a unique identifier assigned to the show and broadcast with the television signal. Such unique identifiers are typically provided by the broadcaster. The chat dialogue can be displayed simultaneously with the television show in a variety of display modes. The combined television and chat content are provided as television markup language (TVML) documents, which are a combination of JavaScript (JS) and dynamic hypertext transfer markup language (DHTML).

The chat room may correspond to a television signal in a variety of ways besides simple corresponding to the individual show that is currently broadcast. For example, the chat room may correspond to a replay of a past television show, such as a past episode in a series, or all episodes that are currently being broadcast. Alternatively, the chat room may correspond to a television channel, such as Fox® News Network. In addition, the chat room may correspond to a category, such as professional football, that may be selected by the viewer while watching a particular football game.

The chat which is displayed on the user interface device may be audio or video instead of text. Audio or video chat may be sent from the user interface device to the chat room. For example, the viewer may speak into a microphone connected to the user interface device to create an audio clip, which is then sent to the IRC server chat room to be broadcast to all the user interface devices connected to that chat room.

Figure 4:
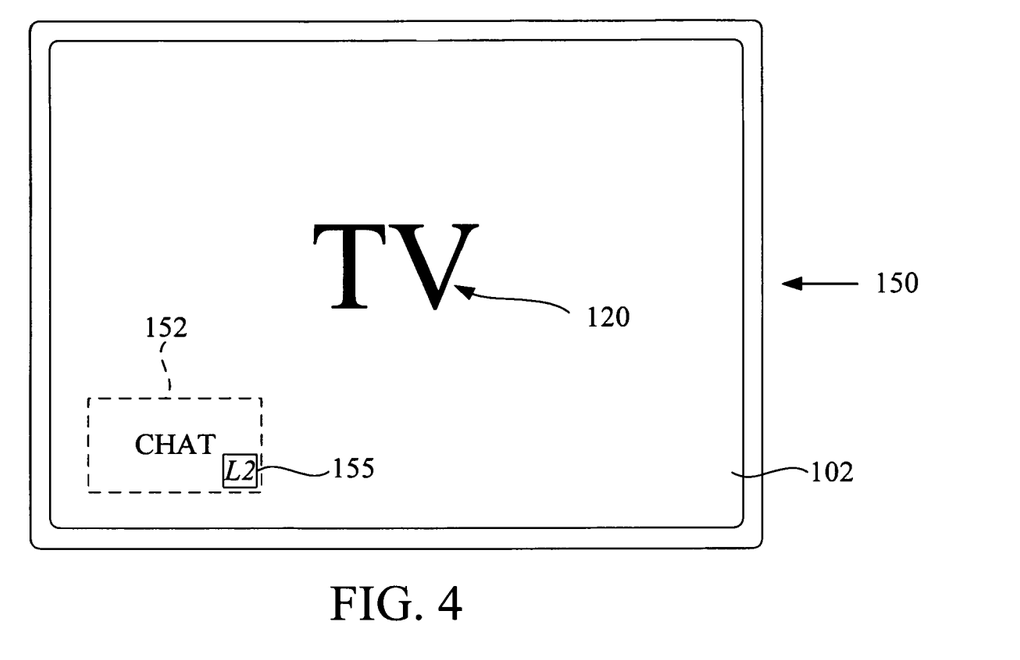
FIG. 4 is a schematic view of a first mode of display on the user interface device of both a television program and chat related to that program.

FIG. 4 shows the display screen 102 presenting the combination of television and Internet content according to a first display mode 150. In this mode, the television show 120 is virtually unchanged from the display that would occur in the absence of chat, aside from a small overlay of chat dialogue 152 in a lower corner of the display screen 102. This first display mode 150 may be considered a relatively passive mode, in which the only user activity is viewing the television and chat. A link 155 is displayed adjacent the chat dialogue, the link providing a convenient means to switch the display to a second mode in which the chat dialogue is more pronounced.

Figure 5:
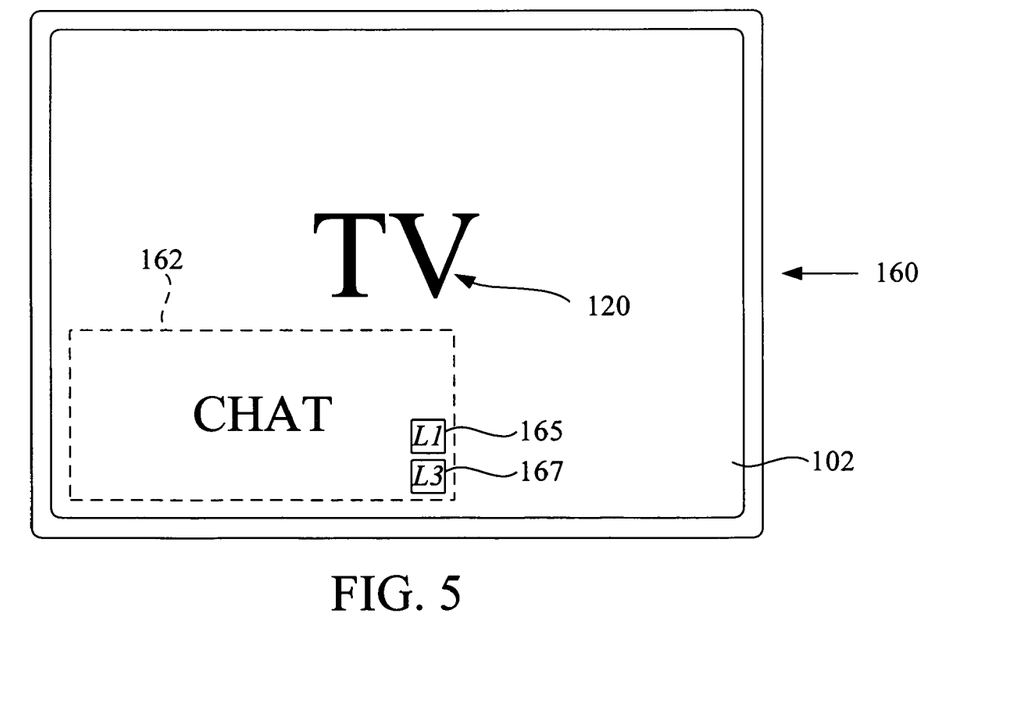
FIG. 5 is a schematic view of a second mode of display on the user interface device of both a television program and chat related to that program.

FIG. 5 shows the display mode 160 that results from selecting and actuating link 155 of the previous figure. In this mode the television show 120 is essentially unchanged while the chat dialogue 162 has grown to occupy a larger portion of the display screen 102. This allows more lines of chat dialogue to be displayed, in a somewhat more active format than that of the previous mode. A link 165 is provided to switch the display back to the first mode, and another link 167 is provided to switch the display to a third mode.

Figure 6:
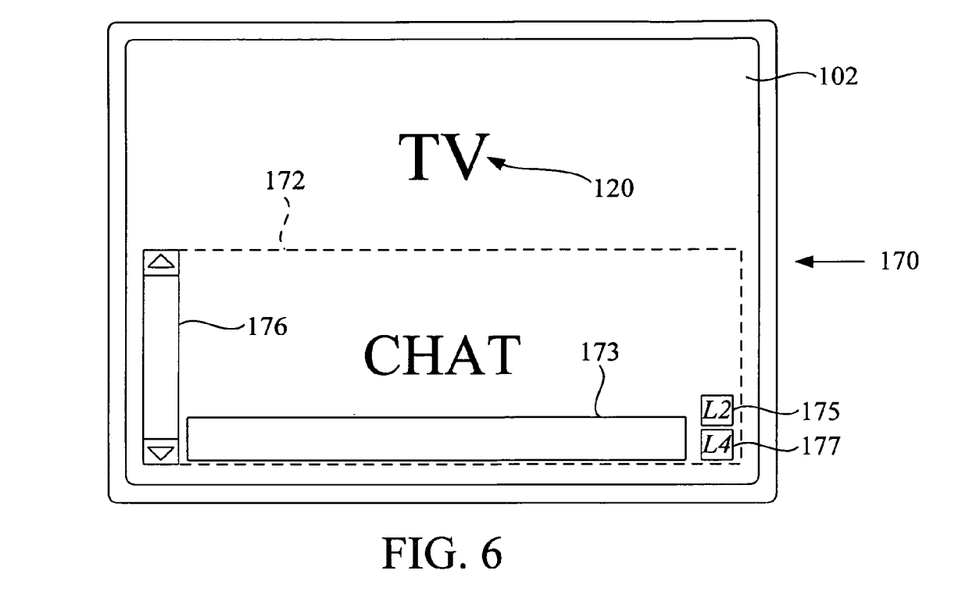
FIG. 6 is a schematic view of a third mode of display on the user interface device of both a television program and chat related to that program.

FIG. 6 shows a third display mode 170 that results from selecting and actuating link 167 of the previous figure. The chat dialogue 172 in this mode occupies a much larger portion of the screen 102, while the television show 120 has been reduced in size and occupies a smaller portion of the screen. The chat 172 may overlay the television show or it may have an opaque or semi-opaque background, for instance. A link 175 is provided to switch the display back to the second mode, and another link 177 is provided to switch the display to a fourth mode. A send bar 173 is also provided in this mode 170 for entering dialogue into the chat room. The dialogue may be typed into the send bar 173 with the keyboard 115 and then sent from the device 100 to the IRC server. Alternatively, the dialogue sent from the device to the IRC server may be selected from certain prescripted chat messages by the pointing device 118, as described in U.S. patent application "System for Interactive Chat Without a Keyboard," invented by Steven Ericsson Zenith, filed on even date herewith and incorporated by reference herein. In this case, the send box may have several prescripted chat messages available for selection. The third display mode 170 also includes a scroll bar 176 for scrolling through the chat dialogue 172, for example to access a part of the dialogue which is not being currently presented on the display.

Figure 7:
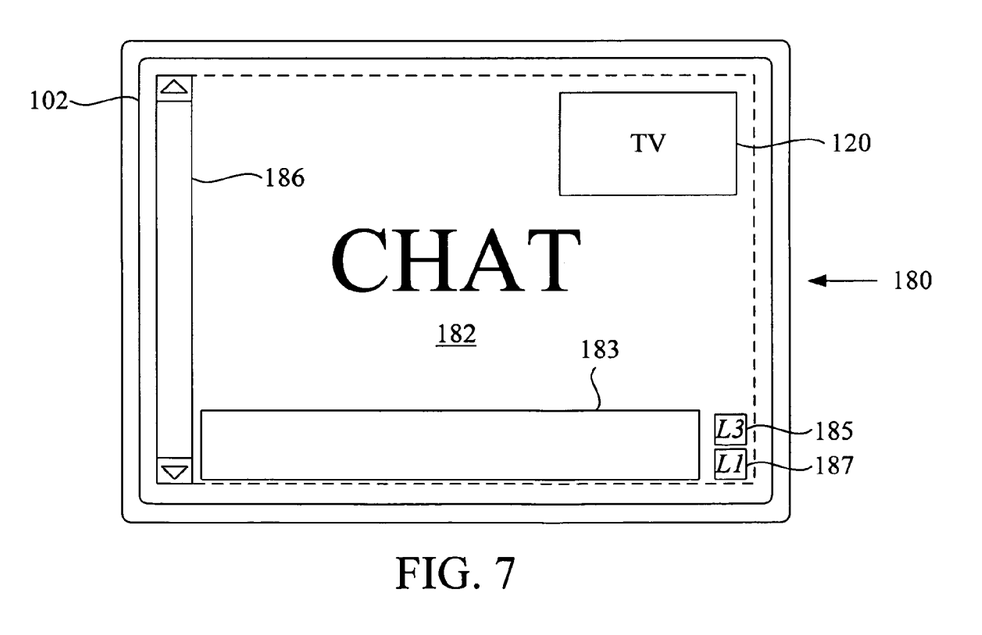
FIG. 7 is a schematic view of a fourth mode of display on the user interface device of both a television program and chat related to that program.

FIG. 7 shows a fourth display mode 180 that results from selecting and actuating link 177 of the previous figure. The chat dialogue 182 in this mode occupies most of the screen 102, while the television show 120 has been reduced in size and occupies only a small window. This mode 180 has the most active chat features of the four modes presented herein as examples. A link 185 is provided to switch the display back to the third mode, and another link 187 is provided to switch the display to the first, least intrusive mode 150. A send bar 183 is also provided in this mode 180 for entering dialogue into the chat room. The dialogue may be typed into the send bar 183 with the keyboard 115 and then sent from the device 100 to the IRC server. Alternatively, as mentioned above, the dialogue sent from the device to the IRC server may be selected from certain prescripted chat messages by the pointing device 118. The fourth display mode 180 also includes a scroll bar 186 for scrolling through the chat dialogue 182, for example to access a part of the dialogue which is not being currently presented on the display.

Different modes of displaying a television show and corresponding chat room dialogue (150, 160, 170 and 180 in this example) may simply be transmitted as different linked web pages from the IRC server. Alternatively, the chat handler program of the user interface device may contain instructions to display according to the different modes, as locally stored TVML documents. Thus, while the input of the television video and chat text are the same in each mode, they are incorporated as tags with different attributes in the different TVML pages, the TVML pages being interpreted by the web browser 101 for display in the different modes.

Changing a television channel while in a combined chat and television mode may result in changing chat rooms to a chat room corresponding to the newly selected television channel. A predetermined waiting period may occur before switching chat rooms, in order to avoid bouncing around various chat rooms during channel surfing until the new channel has been settled upon. For example, switching television channels and remaining on a channel different from the original channel for a time period of perhaps thirty seconds may initiate a request from device 100 to the IRC server chat room corresponding to the new television channel. That chat room can be determined according to a lookup table that has been downloaded to the device memory 108, the lookup table including the unique electronic program guide (EPG) number of the various television shows and the corresponding chat servers. Alternatively, actuating a link to another display mode while tuned to a different television channel can initiate a switch to a new chat room corresponding to the new channel.

Thus, a method, device and system for providing different modes of displaying combined video and Internet content, particularly chat and corresponding television shows, is provided in accordance with the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

The invention claimed is:

1. In a device having a graphical user interface and a display capable of displaying video signals and chat communications in frames on the display in any of a plurality of selectable display modes, each of the display modes defining the relative positions and sizes of the display frames, a method comprising:
    receiving a video signal at the device;
    receiving at the device one or more chat communications corresponding to the video signal;
    displaying the video signal and the one or more chat communications on the display in a first display mode, such that the video signal is displayed in a first frame that has a corresponding size and position on the display, and such that the one or more chat communications are displayed in a second frame that has a corresponding size and position on the display;
    displaying in the second frame a link to a second display mode that is different than the first display mode, such that when the link to the second display mode is selected, the second frame displays the one or more chat communications with at least one of a different frame size or a different frame position than was used by the second frame in the first display mode, and while still displaying the video signal in the first frame; and
    displaying a link to a third display mode within the second frame when the second frame is displayed in the second display mode, and such that when the link to the third display mode is selected, the second frame displays the one or more chat communications with at least one of a different frame size or a different frame position than was used by the second frame in both the first and second display modes, and while still displaying the video signal in the first frame.

2. The method of claim 1, wherein the video signal comprises a television show.

3. The method of claim 1, wherein the one or more chat communications comprise text.

4. The method of claim 1, wherein the one or more chat communications overlay a portion of the video signal.

5. The method of claim 1, further comprising:
    changing the video signal to receive a different channel, and in response to the different channel sending a request to a server for different chat communication corresponding to the different channel.

6. The method of claim 1, further comprising displaying an area on the display for sending information relating to the video signal or the one or more chat communications.

7. The method of claim 1, further comprising displaying an area on the display for sending through the one or more chat communications.

8. The method of claim 1, further comprising:
    selecting the link to the second display mode, wherein the link identifies a television markup language document that represents the second display mode, and
    rendering the document to display the video signal and one or more chat communications in accordance with the second display mode.

9. A method as recited in claim 1, wherein selection of another link also causes the first frame to display the video signal with at least one of a different first frame size and a different first frame position.

10. A method as recited in claim 1, wherein the link to the second display mode comprises a selectable object displayed within the second frame.

11. A method as recited in claim 1, further comprising:
    displaying with the video signal and the one or more chat communications at least one additional link corresponding to at least one additional display mode that is different than the first and second display modes and that when selected causes at least one of the size and position of at least one of the first and second frames to change, and while still displaying the video signal and the chat communications.

12. A device having a graphical user interface and a display capable of displaying video content and chat in a plurality of selectable display formats, each display format controlling the relative positions and sizes of the display frames for the video content and the chat, comprising:
    means for displaying video and chat corresponding to the video in a first display mode, such that the video content is displayed in a first frame that has a corresponding size and position on the display, and such that the chat is displayed in a second frame that has a corresponding size and position on the display;
    means for switching to a second display mode upon receiving a selection from a first link displayed in the second frame at the display, the second display mode being different than the first display mode, such that when the first link is selected, the means for switching to a second display mode includes means for switching at least one of the size or position of the second frame, and while still displaying the chat and video signal in the first and second frames respectively; and
    means for switching to a third display mode upon receiving a selection from a second link that is displayed in the second frame when the second frame is displayed in the second display mode, the third display mode being different than the first and second display modes, such that when the second link is selected, the means for switching to a third display mode includes means for switching at least one of the size or position of the second frame, and while still displaying the chat and video signal in the first and second frames respectively.

13. The device of claim 12, wherein the means for switching to the second display mode includes actuating a hypertext link displayed in the first display mode.

14. A device as recited in claim 12, wherein the means for switching to a second display mode includes means for switching at least one of the size and position of the second frame, while still displaying the video signal in the first frame with at least one of the first frame size and the first frame position.

15. A device as recited in claim 12, wherein the means for switching to a second display mode includes means for switching at least one of the size and position for both the first frame and the second frame, while still displaying the video signal and the chat communications.

* * * * *

UNITED STATES PATENT AND TRADEMARK OFFICE
CERTIFICATE OF CORRECTION

PATENT NO. : 7,036,083 B1  Page 1 of 1
APPLICATION NO. : 09/461565
DATED : April 25, 2006
INVENTOR(S) : Zenith It is certified that error appears in the above-identified patent and that said Letters Patent is hereby corrected as shown below:

In column 8, line 16, in Claim 7, delete "sending" and insert -- scrolling --, therefor.

Signed and Sealed this

Thirteenth Day of April, 2010

David J. Kappos
*Director of the United States Patent and Trademark Office*